Figure 1:
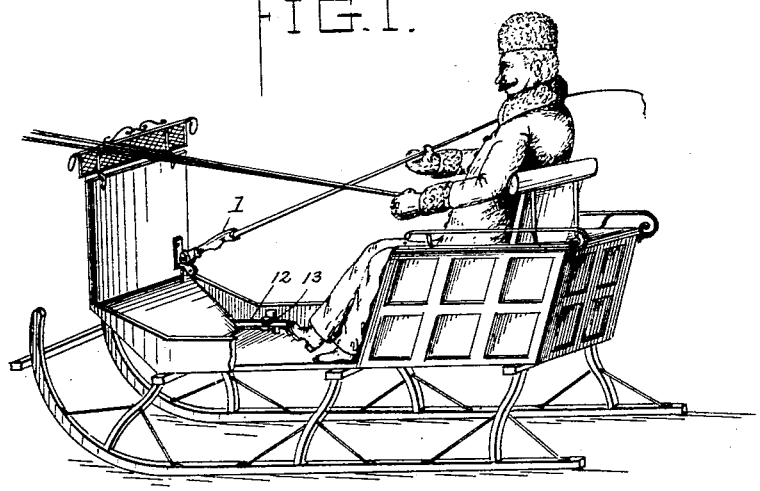
Figure 2:
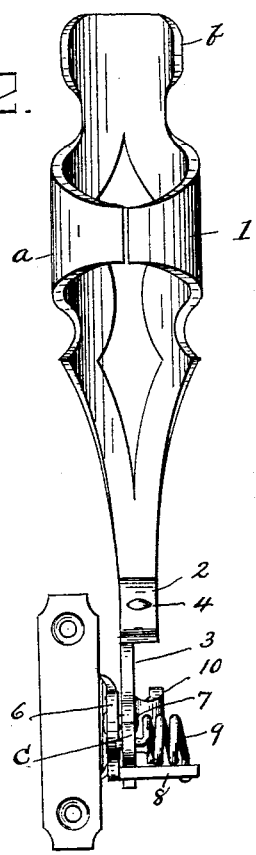

(No Model.)
C. G. HARRIS.
DEVICE FOR FEEDING PRINTING PRESSES.
No. 586,490. Patented July 13, 1897.
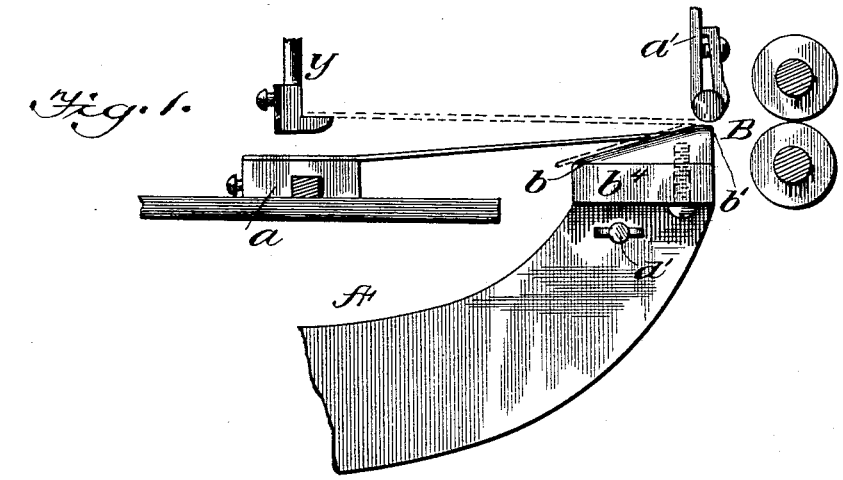
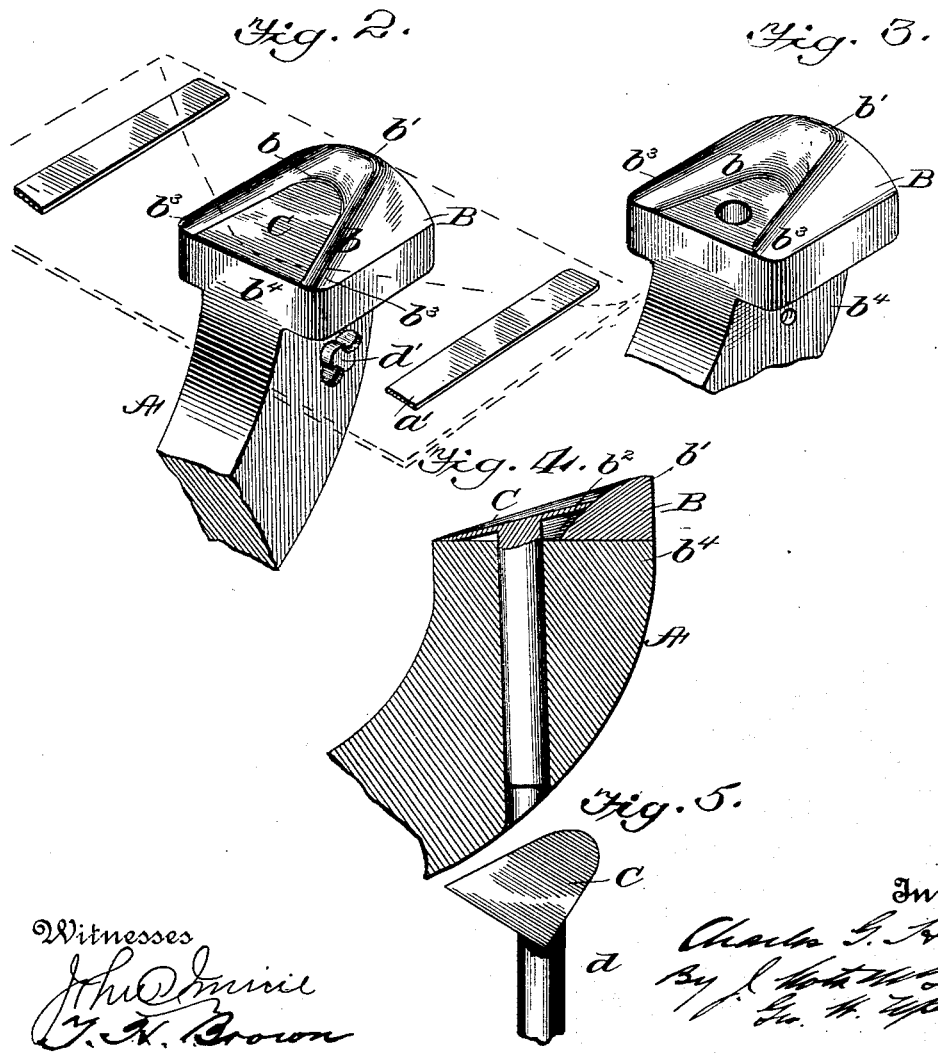
Witnesses
Inventor
Charles G. Harris,
By
Attorneys (No Model.) 2 Sheets—Sheet 1.
R. A. HARTLEY.
WHIP SOCKET.

No. 586,491. Patented July 13, 1897.

WITNESSES

INVENTOR
Robert A. Hartley.
By John Hedderburn
Attorney